United States Patent [19]

Poulis et al.

[11] Patent Number: 6,128,311
[45] Date of Patent: Oct. 3, 2000

[54] METHOD AND SYSTEM FOR INTERFACING PARALLELLY INTERFACED DEVICES THROUGH A SERIAL BUS

[75] Inventors: Spiro Poulis, Kearns; David M. Arnesen, West Jordan, both of Utah

[73] Assignee: 3COM Corporation, Santa Clara, Calif.

[21] Appl. No.: 09/031,103

[22] Filed: Feb. 26, 1998

[51] Int. Cl.⁷ ................................................. H04L 12/66
[52] U.S. Cl. .................... 370/463; 370/419; 370/524; 709/250
[58] Field of Search .................... 370/360, 363, 370/366, 367, 368, 419, 463, 524; 395/154; 710/260; 709/250, 302

[56] References Cited

U.S. PATENT DOCUMENTS

| 5,553,220 | 9/1996 | Keene ...................................... 395/520 |
| 5,581,464 | 12/1996 | Wool et al. ............................... 701/35 |
| 5,793,989 | 8/1998 | Moss et al. .............................. 710/105 |
| 5,838,682 | 11/1998 | Dekelbaum et al. .................... 370/401 |
| 5,923,709 | 7/1999 | Keel et al. ............................... 375/257 |
| 5,926,208 | 7/1999 | Noonen et al. .......................... 348/17 |
| 5,982,459 | 11/1999 | Fandrianto et al. ................. 348/845.2 |

*Primary Examiner*—Hassan Kizou
*Assistant Examiner*—Saba Tsegaye
*Attorney, Agent, or Firm*—Workman, Nydegger & Seeley

[57] ABSTRACT

A method and apparatus for interconnecting via a serial bus a master processor and a co-processor having directly interfaceable parallel interfaces thereby accommodating the remote location of the co-processor from the master processor. The master processor interfaces with a serial bus interface for converting the parallel interface of the master processor into a serial interface forming a serial bus including a serial data out signal, a serial data in signal, a serial clock signal and a frame sync signal. The serial bus interfaces with the remote module having the co-processor located therein. The serial bus interfaces directly with an interface controller for converting the serial information back to a parallel format compatable with the requirements of the co-processor's parallel interface. The interface controller is further capable of generating control signals such as resets and general purpose outputs when directed by the master processor and reading status of the co-processor when also directed by the master processor. Testing functionality is also included for specific incorporation of an ISDN-specific I/O interface device functioning as the co-processor.

18 Claims, 7 Drawing Sheets

METHOD AND SYSTEM FOR INTERFACING PARALLELLY INTERFACED DEVICES THROUGH A SERIAL BUS

BACKGROUND OF THE INVENTION

1. The Field of the Invention

This invention relates generally to digital communication systems employing parallel interfaces. More particularly, the invention relates to interfacing parallelly interfaced devices through a restricted or minimal bus architecture.

2. Present State of the Art

Traditional digital data systems, such as computers and modems, utilize a bus architecture for interfacing components with one another. In one example, a personal computer employs a computer bus, such as an Industry Standard Architecture (ISA), to define a standard parallel bus architecture onto which devices, such as microprocessors and memory devices, are connected to facilitate a data highway over which data may be exchanged with other components. Such bus architectures have employed parallel bus implementations to enhance the data throughput capability required in exchanging high-data rate information.

Figure 1:
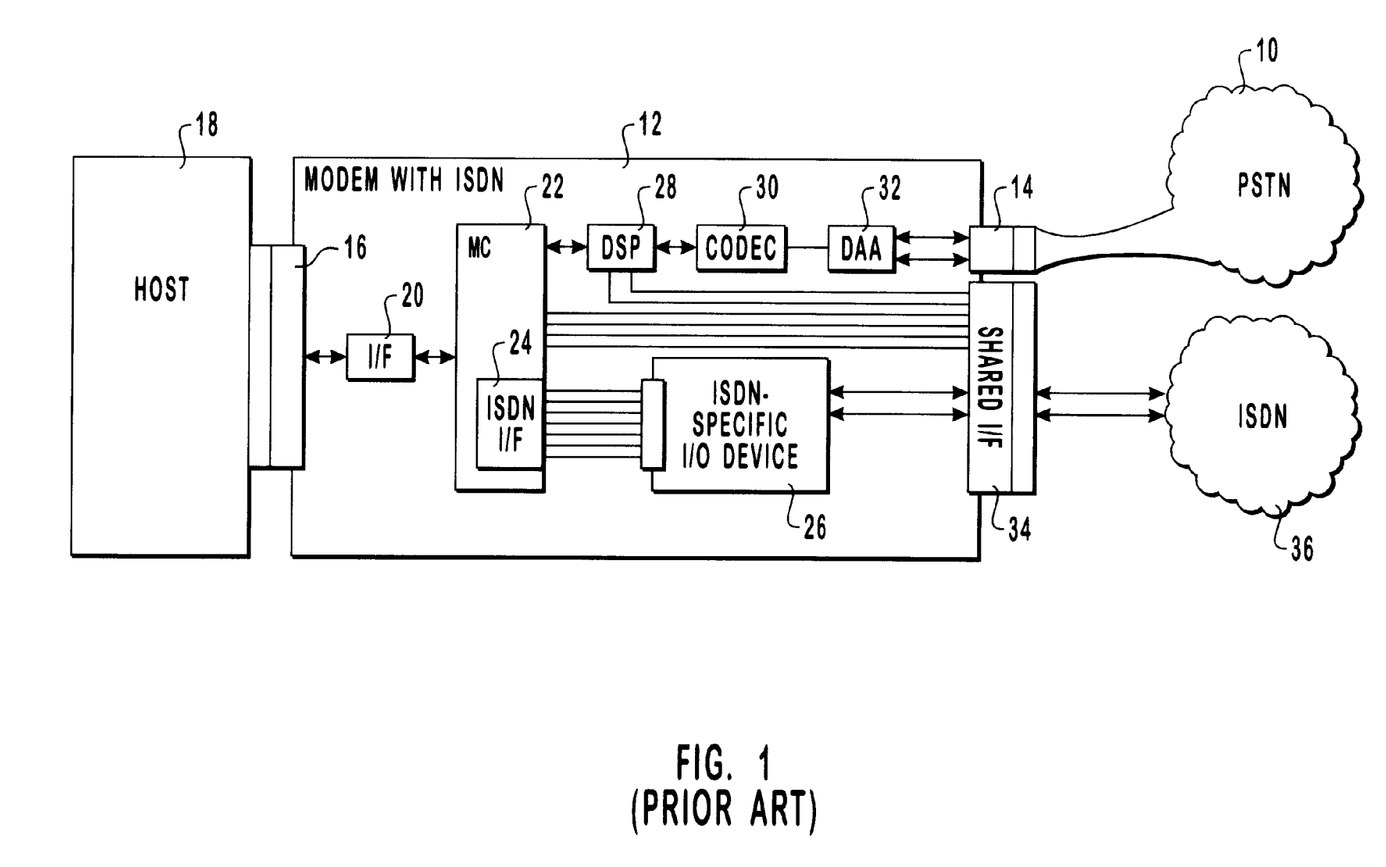
FIG. 1 is a simplified block diagram of a prior art architecture parallelly interfacing a processor and a co-processor within a single module.

Likewise, peripheral modules such as modems also employ similar bus architectures for interfacing the microcontroller with other support devices such as a digital signal processor or other parallelly interfacable components such as memories and I/O support devices. For example, FIG. 1 illustrates a prior art depiction of a host 18 which may take the form of a personal computer interfacing via a bus architecture, such as ISA, PCI, PCMCIA or others, to a peripheral device such as a modem 12. Such devices couple via a connector 16 generally supporting yet a parallel interface with host 18. The electronics of such an interface are illustrated as interface 20 wherein timing, signalling, drive levels and other required interface signal conditions required by host 18 are implemented for compatible communication between host 18 and modem 12.

Modem 12, in a traditional role, couples to a public switched telephone network (PSTN) 10 to provide routing for modulated data generated or consumed by host personal computer 18. A controller 22 controls or facilitates the exchange of data between a digital signal processor 28 providing modulation of digitized data with host 18. A CODEC 30 performs traditional analog-to-digital and digital-to-analog conversion between the digital and analog domains, while a DAA 32 implements an isolation boundary thereby providing protection and safety between host 18 and PSTN 10. Such an implementation further employs an interface 14, generally consisting of an RJ-11 interconnection to the tip and ring signals associated with PSTN 10.

Such a traditional modem implementation provided an interface with PSTN 10 for implementing a traditional data propagation path capable of the sustained bandwidth levels associated with PSTN 10. As modem 12 came to be employed in other applications other than the physical cabling of host 18 with PSTN 10, additional functionality was incorporated within modem 12. For example, many modern modems may be employed to exchange data over modern communication channels such as wireless communication channels. In such an embodiment, the transmit and receive data are exchanged with a wireless transceiver such as a cellular telephone through a digital interface resident to the wireless transceiver. Such a digital interface with the wireless transceiver requires the development of a shared interface 34 providing such interface signals such as data in, data out, clock, and other signaling conduits as required by the digital interface of wireless transceivers. Such additional functionality requires that a significant number of contact pins be resident within shared interface 34 for an operable interconnection with a peripheral device such as wireless transceiver.

While physically larger implementations of modem 12 are more accommodating for the growth of shared interface 34 resulting from increased incorporation of functionality within modem 12, modern and miniaturized integrated versions of modem 12, such as PCMCIA implementations, contain physical size restraints on the size and pin-count associated with shared interface 34.

Furthermore, yet more modern implementations of modem 12 incorporate improved digital exchange technology, such as is associated with the Integrated Services Digital Network (ISDN) which provides improved bandwidth for data exchanges. Referring to FIG. 1, an ISDN network 36 requires specific signaling from modem 12 for compatible interface therewith. Integration of such enhanced technology within modem 12 requires the integration of an ISDN-specific I/O device 26 for performing such required signaling standards. Interfacing of ISDN signals from modem 12 with ISDN network 36 requires the routing of such signals through shared interface 34. Such routing of signals through shared interface 34 further consumes a portion of any residual pins associated with shared interface 34 in a form factor-restricted implementation of modem 12 such as in the case of a PCMCIA or other integrated peripheral implementation.

For efficiency and bandwidth concerns, ISDN-specific I/O device 26 employs a parallel interface with controller 22 via an ISDN interface 24. Such a parallel interface facilitates enhanced data rate exchanges between DSP 28 and ISDN-specific I/O device 26.

While such a prior art implementation of the embodiment illustrated in FIG. 1 depicts the incorporation of ISDN-specific I/O device 26 within the form-factor associated with modem 12, other implementations of modems prefer the placement of ISDN-specific I/O device 26 external to modem 12. Such an embodiment is beneficial in applications wherein the integration of ISDN-specific I/O device 26 within the physical confines of modem 12 would violate size or design constraints placed upon modem 12. In such implementations, ISDN-specific I/O device 26 is better placed in yet an external module or podule separate and external to modem 12. While such an implementation may meet the timing and signaling conditions as required by ISDN network 36, the standard modem interface associated with ISDN-specific I/O device 26 employs a parallel interface with controller 22 and DSP 28. In an embodiment incorporating the external placement of ISDN-specific I/O device 26, such routing of the parallel interface further consumes vacant pins associated with shared interface 34. In fact, in physically limited implementations of modem 12, such as in PCMCIA, shared interface 34 may be physically unable to accommodate all of the parallel interface lines therethrough. While external placement of ISDN-specific I/O device 26 may provide economic integration benefits, external placement of a parallelly interfaced device such as ISDN-specific I/O device 26 outside the physical bounds of modem 12 may be physically prohibitive if the entire parallel interface is incapable of being routed through restricted shared interface 34.

Thus, what is needed is a method and system for interfacing parallelly interfaced devices through a restricted path interface. Furthermore, what is desired is a method and system for interfacing parallelly interfaced devices via a restricted path conduit without incurring significant throughput performance degradation.

SUMMARY AND OBJECTS OF THE INVENTION

It is an object of the present invention to provide a method and apparatus for directly interfacing parallelly interfacable devices to one another indirectly via a serial bus connected therebetween.

Another object of the present invention is to provide a method and apparatus for remotely locating a parallelly interfacable co-processor from a master processor.

A still further object of the present invention is to provide a method and apparatus for remotely locating functionality from a first module to a second remote module that would otherwise directly parallelly interface with the functionality of the first module.

Yet another object of the present invention is to provide a method and system for incorporating a parallelly interfacable Integrated Services Digital Network (ISDN) interface device into an external module serially interconnected with a modem.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. To achieve the objects, and in accordance with the invention as embodied and broadly described herein, a method and system for incorporating a co-processor into a remote module serially interconnected to a master module is provided.

Many processing systems employ a master processor or controller for orchestrating the overall functionality of a system. When processing requirements tax the master processor or when specialized processing is more efficiently executed using a custom architecture, systems incorporate co-processors which execute specialized processes. Typical co-processor types include math co-processors and communication co-processors including ISDN-specific interface co-processors. Additionally, master processor types include microprocessors, microcontrollers and mastering or independent digital signal processors (DSPs). The inclusion of co-processors within the module of the master processor requires additional area and other considerations including the cost associated with the initial purchase of the module. Frequently, partitioning the cost associated with the overall functionality across multiple modules results in a more palatable and therefore marketable price associated with the master module.

For efficient interfacing of a co-processor to a master processor, the master and co-processors generally employ a parallel interface to improve the data transfer rate therebetween. Parallel interfaces require a significant quantity of interconnection lines for routing each of the data and control lines associated with the parallel interface between the master and co-processors. When the module of the master processor and the module of the co-processor are remotely located, a significant number of data and control lines must be carried through connectors associated with the corresponding modules. The present invention presents a serial interface through which parallel devices may be interfaced. One such embodiment presented depicts a modem having a DSP as the master module and processor, respectively. In the exemplary embodiment, the co-processor located in a remote module takes the form of a communication processor such as an ISDN-specific interface device.

In the present invention, processors or devices having parallel interfaces may be interconnected via a serial bus. A module, such as a modem, may include a universal connector through which remote functionality may be interconnected. For small form-factor modems such as a PCMCIA, the universal connector is restricted in size by the modem standard form-factor. One exemplary existing use for the universal connector is to facilitate the interconnection of a wireless transceiver for implementing a wireless communication channel. Since the form-factor of a PCMCIA modem may dictate the size and hence the capacity of the universal connector, the remaining pins available on the universal connector for interfacing to an external module may be limited thereby prohibiting a parallel interface.

To facilitate control, routing and execution of data transmissions, the modem further includes a controller operatively and electrically accommodating an interface with the processor exemplarly depicted as a DSP. The controller converts parallel command and data words into serial command and data words according to a master serial protocol and transforms received serial information into a parallel format for processing by the DSP. In one preferred embodiment, the controller comprises an application specific integrated circuit (ASIC) which provides routing, timing and other command and data handling for storage and processing for the DSP.

The controller further includes a serial bus interface for performing the actual serial-to-parallel and parallel-to-serial conversion for exchange over a serial bus. The serial bus interface includes an ISDN interface and a serial interface with the serial interface performing the physical transformation of parallel information into serial format and further generating a serial clock and frame sync pulses as required for serial information exchange. In the present invention, the serial bus is transparent to the modem host as the modem directs communication immediately with the DSP rather than the serial bus. The serial bus interface further incorporates specific protocol functionality as in the case of an ISDN interface and further implements the serial interface for translation of data formats between serial and parallel forms. The serial ISDN interface is implemented as a series of command and data shift registers and command and status registers which are parallelly accessible by the DSP as they are mapped directly into the aforementioned's address space. The serial ISDN interface implements a full duplex serial bus comprised of a serial data in signal for transferring serial data from the external module to the modem and a serial data out signal for providing a serial information path from the modem to the external module. The serial bus further includes a serial clock signal and a serial frame sync signal signifying the beginning of a series of valid data elements.

The universal connector of the modem interfaces with the external module having a serial connection via the serial bus. The second or external module may be immediately associated with the universal connector or more remotely located through the use of a cable means. The external module is further comprised of an interface controller connected to the serial bus. The interface controller further includes a parallel interface for direct interfacing with a co-processor or other parallelly interfacable device. In one preferred embodiment, the co-processor takes the form of an ISDN-specific I/O device. The exemplary ISDN-specific I/O device, in addition to the parallel interface, exhibits a serial interface for interfacing directly with an ISDN system.

In the preferred embodiment of the present invention, the modem module interfaces with the external module which is comprised of an interface controller and an ISDN-specific I/O device. ISDN-specific I/O device further interfaces directly with the ISDN system to provide a communication path through the ISDN system. The external module includes an interface controller including a compatible serial bus interface and a parallel interface for coupling with a co-processor such as an ISDN-specific I/O device. The interface controller comprises an ASIC device integrating a modem interface and an ISDN-specific I/O device interface. The modem interface provides the corresponding interface for the serial bus including the drivers and receivers necessary for transmitting the serial data in signal and receiving each of the serial data out signal, the serial clock signal and the serial frame sync signal. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention embodies within its scope both methods and systems for interfacing a processor having a parallel interface with a co-processor also having a compatible parallel interface via a serially interconnected bus. The purpose of this invention is to facilitate the interfacing over a serial bus of devices such as a processor and co-processor having parallel interfaces.

Figure 2:
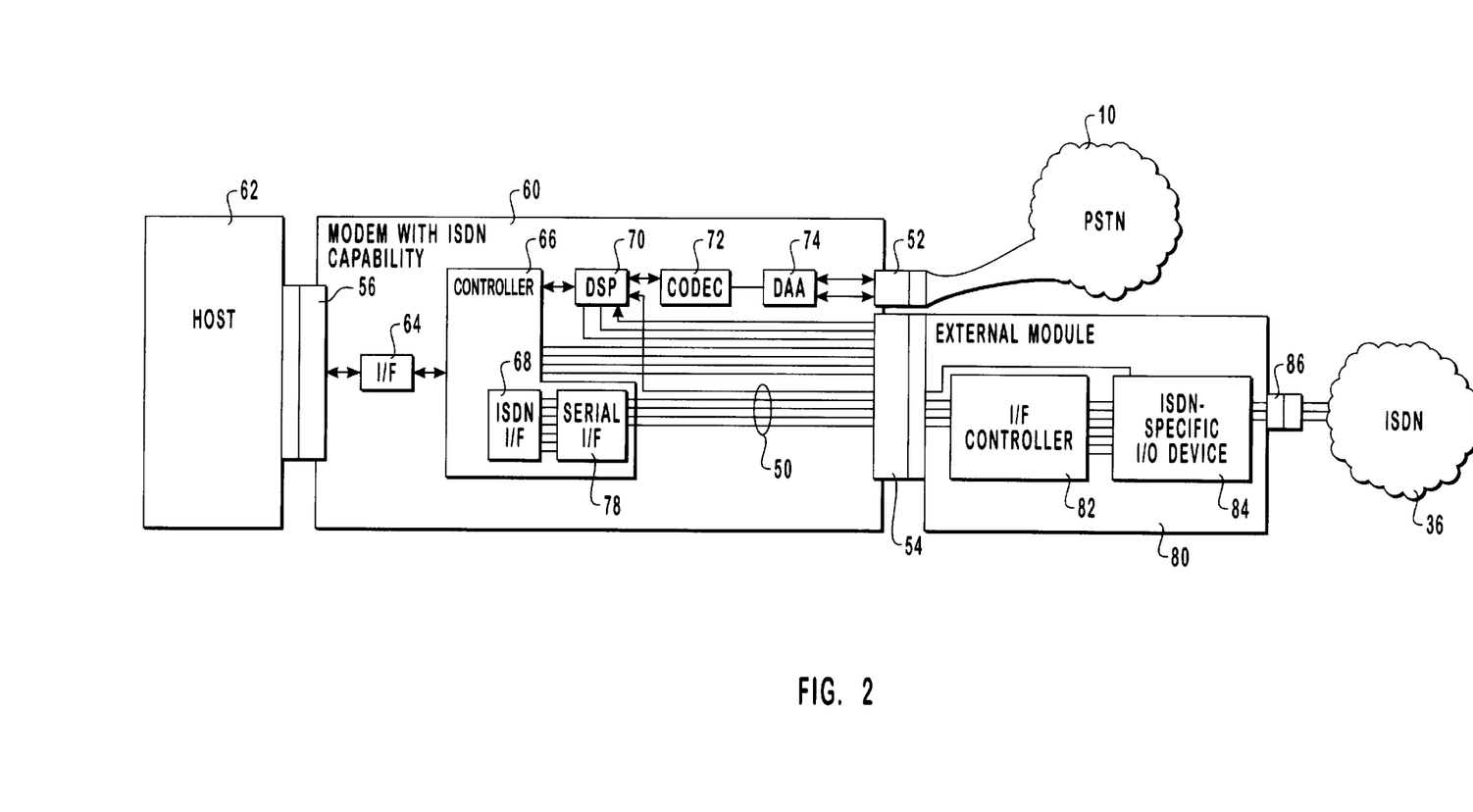
FIG. 2 is a simplified block diagram of an architecture for interfacing a processor having a parallel interface with a co-processor also having a parallel interface via a serial bus, in accordance with a preferred embodiment of the present invention.

FIG. 2 depicts a simplified block diagram of devices having parallel interfaces that are remotely located and interconnected via a serial interface, in accordance with the preferred embodiment of the present invention. FIG. 2 depicts a specific embodiment of the present invention having a modem 60 interfacing with an external module 80. While such an embodiment depicts a specific application of the present invention, other embodiments other than those employing modem technology are also considered to be within the scope of the present invention. In FIG. 2, a modem 60 provides the conversion of digital information generated by a host 62, such as a personal computer, to a propagable modulated format for dispatch over a network.

In the present embodiment, modem 60 employs an interface 52 for interfacing with a public switch telephone network 10 as is common for traditional modem based communications. Additionally, modem 60 further comprises means for supporting additional functionality through a universal connector 54. Such a means may accommodate functionality relating to the interfacing of modem 60 with a wireless transceiver such as a cellular telephone or other interface providing direct data access between a host 62 and a separate network such as an ISDN network 36. To facilitate control, routing and execution of data transmissions, modem 60 further includes a controller means operatively and electrically accommodating an interface between host 62 and digital signal processor 70. Such a controller means provides an interface between an interface 64 via an interface standard 56 such as a PCMCIA bus with host 62 and DSP 70. The controller means converts parallel command and data words into serial command and data words according to a master serial protocol and transforms received serial information into a parallel format for processing by DSP 70. By way of example, and not limitation, in FIG. 2 the controller means is depicted as controller 66. In one preferred embodiment, controller 66 comprises an application specific integrated circuit (ASIC) which provides routing, timing and other command and data handling for storage and processing between host 62 and DSP 70.

Controller 66 further includes a serial bus interface means for performing the actual serial-to-parallel and parallel-to-serial conversion for exchange over a serial bus 50. In FIG. 2, the serial bus interface means is depicted as ISDN interface 68 and serial interface 78. As the present specific figure depicts one use of the present invention for interfacing with ISDN network 36, ISDN interface 68 provides the requisite signaling and formatting associated with ISDN communications. Serial interface 78 performs the physical transformation of parallel information into serial format and further generates a serial clock and frame sync pulses as required for serial information exchange. The serial bus interface means is further depicted and described in FIGS. 3 and 4.

As briefly described above, serial bus 50 may be employed for the exchange of parallel information in instances where universal connector 54 may have a limited number of available expansion pins or for instances where a serial bus exchange is more efficient due to the limited number of interconnection lines or yet other conditions where exchange of serial data is more feasible and practical. One such embodiment where universal connector 54 may exhibit a restricted number of available pins for exchanging data with an external module occurs when modem 60, or more broadly a first module, assumes a small integrated form-factor such as when modem 60 is implemented as a PCMCIA modem. In such a form-factor, universal connector 54 may be restricted by the dimensions associated with the specification of such a module standard.

Universal connector 54 interfaces with a second module having a serial connection via serial bus 50 with a first module, or modem 60. In FIG. 2, the second module is depicted as external module 80 which may be immediately associated with universal connector 54 or more remotely located through the use of a cable means. External module 80 further comprises an interface controller means operatively and electrically connected to serial bus 50. The interface controller means, in FIG. 2, is depicted as interface controller 82. In one preferred embodiment, interface controller 82 comprises an application specific integrated circuit (ASIC) and may alternatively be implemented as discrete components for providing buffering of serial and parallel data. Interface controller 82 is further described in detail in FIG. 6.

Interface controller 82 is further comprised of a parallel interface for direct interfacing with a co-processor or other parallelly interfacable devices. By way of example, and not limitation, in FIG. 2 the co-processor is depicted as an ISDN-specific I/O device 84. ISDN-specific I/O devices are produced by a variety of manufacturers with one such device being an AM79C30 manufactured by AMD. Such an ISDN-specific I/O device, in addition to the parallel interface, exhibits a serial interface 86 for interfacing directly with ISDN network 36. The serial interface of ISDN-specific I/O device may take the form of a U or S/T termination as specified by the applicable ISDN standard supported by such a service provider.

Figure 3:
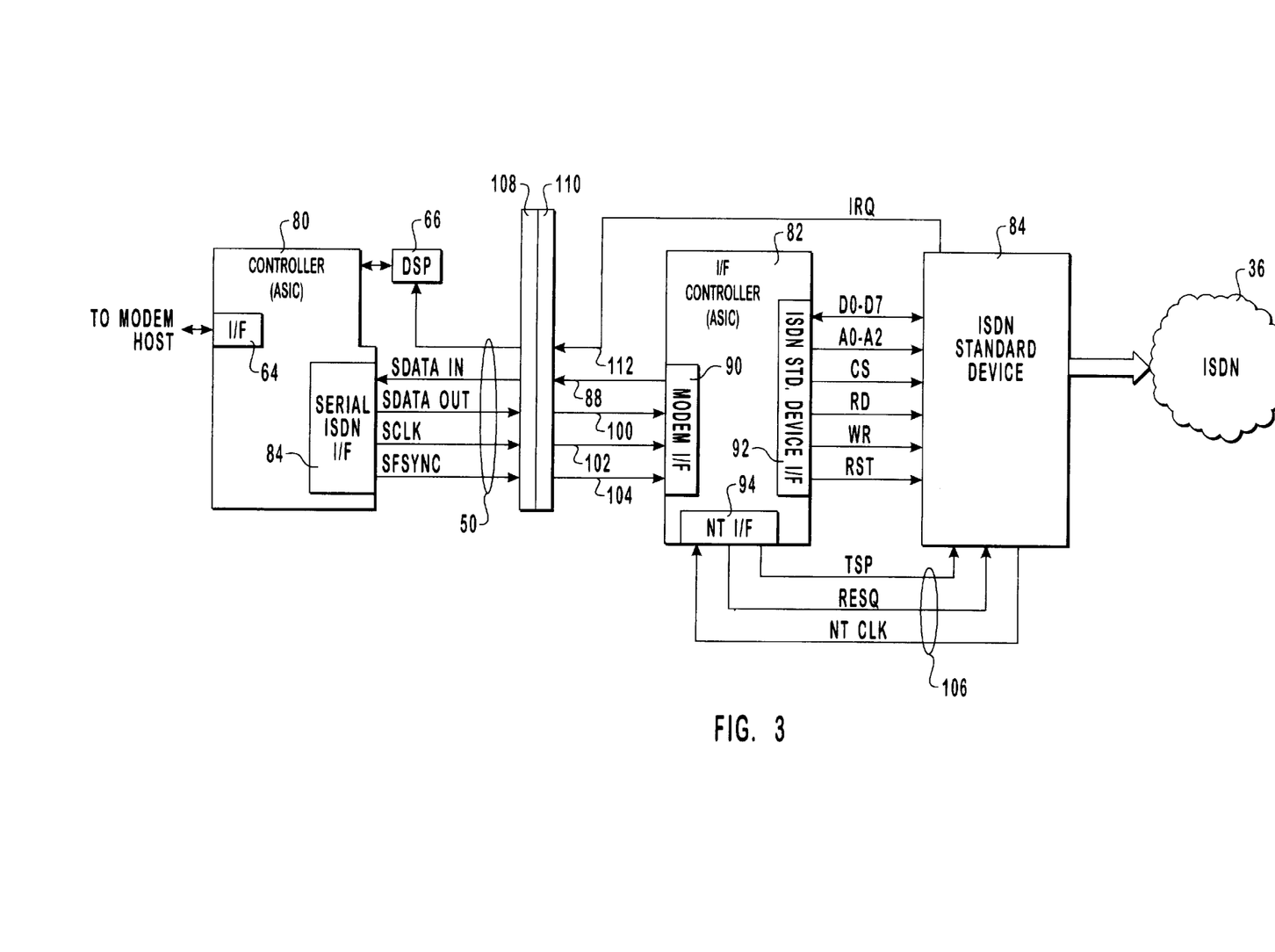
FIG. 3 is a simplified block diagram of an apparatus for interfacing a first module having incorporating a parallelly interfacing processor with a second module having a parallelly interfacing co-processor via a serial interface, in accordance with a preferred embodiment of the present invention.

FIG. 3 depicts a simplified diagram illustrating the interfaces and signals passing by way of a serial interface, in accordance with a preferred embodiment of the present invention. As described above, a controller means provides an interface between a host, a DSP 66 and a serial bus 50. By way of example, and not limitation, in FIG. 3 a first module, such as a modem, comprises a controller means depicted as controller 80 for providing a mediated interface. In one preferred embodiment, controller 80 comprises an ASIC device incorporating host interface 64 for providing a parallel interface to the host system generally through the host bus. Controller 80 further comprises an interface with DSP 66 for responding to commands and controls generated by DSP 66. In the preferred embodiment, DSP 66 forms the master processor which dictates the reads and writes to and from a second or external module. In the present invention, the serial bus is transparent to the modem host as the modem directs communication immediately with the DSP rather than the modem host interacting directly with the serial interface as described below.

The controller means further comprises a serial bus interface means, as briefly described above, which may incorporate specific protocol functionality as in the case of ISDN interface 68 (FIG. 2) and further implements the serial interface, such as serial interface 78 (FIG. 2) for translation of data formats between serial and parallel forms. By way of example, and not limitation, in FIG. 3 the serial bus interface means is depicted as serial ISDN interface 78 for performing the aforementioned functionality. Serial ISDN interface 78 is implemented, in the preferred embodiment, as a series of command and data shift registers and command and status registers which are parallelly accessible by DSP 66 as they are mapped directly into the address space associated with DSP 66. Further details of the specific implementation of serial ISDN interface 78 are described in detail in FIG. 4. Serial ISDN interface 78 implements a full duplex serial bus 50. Serial bus 50 is comprised of a serial data in signal 88 for transferring serial data from the external module to the modem and a serial data out signal 100 for providing a serial information path from the modem to the external module. Serial bus 50 is further comprised of a serial clock signal 102 for providing a synchronous clock to the external module signifying valid timing of exchanged data. Serial bus 50 further comprises a serial frame sync signal 104 signifying the beginning of a series of valid data elements. In an alternate embodiment, serial bus 50 further comprises interrupt request signal 112 from the external module directly to DSP 66 signifying a service request from the external module. Interfaces 108 and 110 represent the respective connector elements associated with the modem module and the external module.

As described above, the modem module interfaces with the external module which is comprised of an interface controller means and an ISDN-specific I/O device 84. ISDN-specific I/O device 84 further interfaces directly with ISDN network 36 to provide a communication path through the ISDN system. It should be reiterated that while the present depiction in FIG. 3 is a first module illustrated as a modem serially interfacing with a second module illustrated as an external module, other non-modem applications are considered to be within the scope of the present invention. For example, other processing architectures employing a processor having a parallel interface capable of direct interface to a co-processor also having a parallel interface may be directly interfaced using their respective parallel interfaces through a serial bus as taught in the present invention by employing a serial bus interface means interfaced to the processor which generates a serial bus interface to an interface controller means which yet is interfaced directly to the parallel interface of the co-processor.

Returning to the embodiment of FIG. 3, an external module includes an interface controller means, as briefly described in FIG. 2, including a compatible serial bus interface and a parallel interface for coupling with a co-processor such as an ISDN-specific I/O device 84. By way of example, and not limitation, in FIG. 3 the interface controller means is depicted as an interface controller 82. In one preferred embodiment, interface controller 82 comprises an ASIC device integrating a modem interface means, depicted as modem interface 90, and an ISDN standard device interface means depicted as ISDN-specific I/O device interface 92. Modem interface 90 provides the corresponding interface for serial bus 50 including the drivers and receivers necessary for transmitting serial data in signal 88 and receiving each of serial data out signal 100, serial clock signal 102 and serial frame sync signal 104. Further details associated with modem interface 90 and ISDN-specific I/O device interface 92 are included in the description relating to FIG. 6.

In the specific depicted embodiment employing ISDN communication protocol, interface controller 82 further includes a general purpose I/O interface means for asserting control signals and receiving status signals. By way of example, and not limitation, in FIG. 3 the general purpose I/O interface means is depicted as an NT interface 94. NT interface 94 employs command signals, designated as TSP and RESQ, for configuring ISDN-specific I/O device 84 and an NT CLK signal for receiving status information. Such signals, TSP, RESQ and NT CLK signals comprise NT signals 106 providing the means to detect certain signal patterns from the ISDN network 36 and aubsequently enter maintenance states which are known by those of skill in the art.

Figure 4:
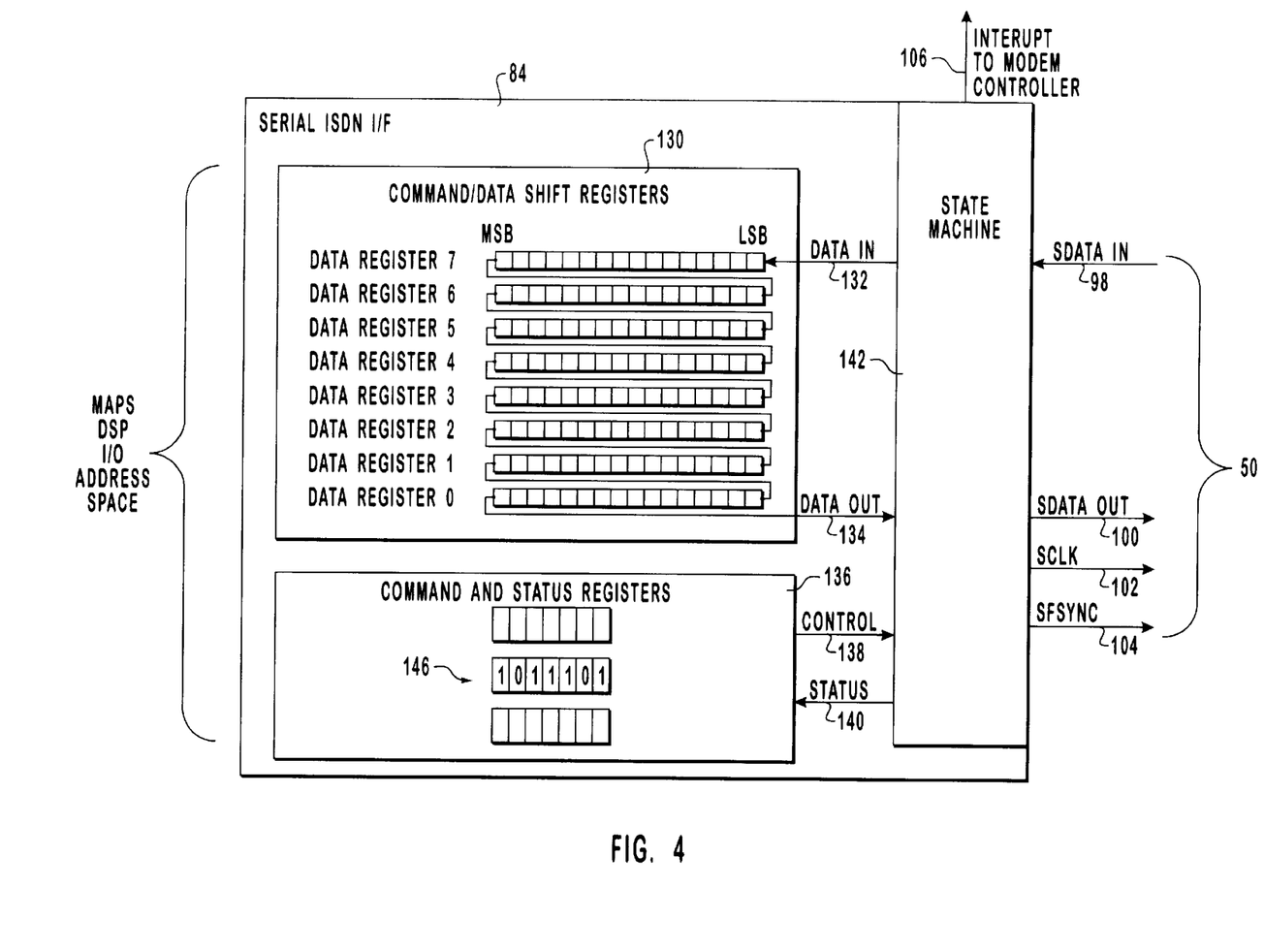
FIG. 4 is a simplified block diagram of a serial interface through which a processor interacts for serially exchanging parallel information across a serial bus to a parallel interface of a co-processor in a second module, in accordance with the preferred embodiment of the present invention.

FIG. 4 is a block diagram of a serial bus interface means, in accordance with the preferred embodiment of the present invention. As briefly described above, a serial bus interface means provides a parallel-to-serial interface between the parallelly interfaced master processor, such as DSP 66 (FIG. 3) and serial bus 50. By way of example, in FIG. 4 the serial bus interface means is depicted as serial ISDN interface 84. In one preferred embodiment, serial ISDN interface 84 is implemented as an ASIC device providing buffering and control of command and data as well as serial bus control signals for the mastering of serial bus 50. While the present embodiment employs an ASIC device, discrete devices as well as programmable devices may also be employed and are to be considered within the scope of the present invention.

Serial ISDN interface 84 is comprised of at least one shift register that is both parallelly addressable by the processor for the writing of parallel commands and data into the serially shiftable shift register and additionally capable of having serially received commands and data, including status, parallelly extracted or read from the shift register. In FIG. 4, such a shift register means is depicted as command/data shift registers 130. In the present depiction, command/data shift registers 130 employ a series of registers that are parallelly addressable and serially shiftable. That is to say, the serial data in signal 98 receives serial data and passes such data through state machine 142 as a data in signal 132 to a data register which serially shifts the data through the registers until the processor parallelly reads the register thereby extract the serial data in a parallel word or byte. Likewise, command or data information originating from the master processor is parallelly written into a register within command/data shift registers 130 and serially shifted out as data out signal 134 passing through state machine 142 to the serial data out signal 100 of serial bus 50.

Figure 5:
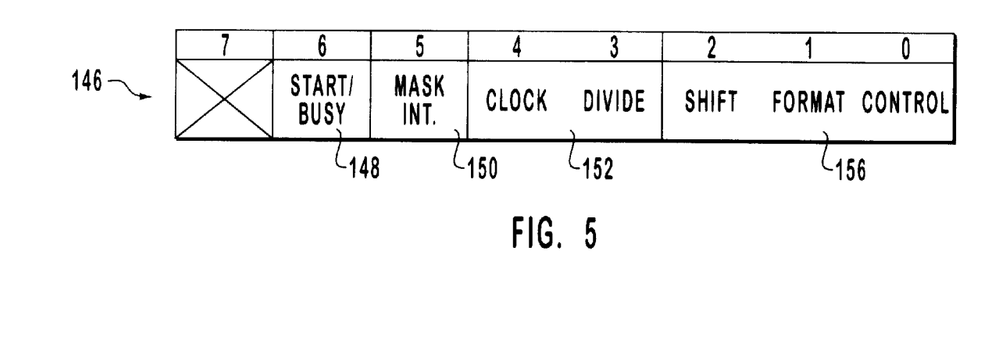
FIG. 5 depicts a command word format as generated by a processor for dictating operation to a serial interface, in accordance with the preferred embodiment of the present invention.

Serial ISDN interface 84 further comprises command and status registers 136 which are parallelly written to and read from by the master processor such as DSP 66 (FIG. 3). Command and status registers 136 receive a command and status word 146 from the master processor which directs state machine 142 to execute a specified command. FIG. 5 depicts the format for command word 146 as employed in the preferred embodiment of the present invention. Referring to FIG. 5, a start/busy indicator 148 directs the state machine to either begin transmitting a specific set of command/data words written to shift registers 130 or to remain in a busy or idle state. Additionally, a mask interrupt indicator 150 permits or masks an interrupt 106 (FIG. 4) from the state machine to DSP 66 (FIG. 3). Additionally, clock divide indicators 152 control the speed or frequency of serial clock 102 (FIG. 4) while shift format control indicators 156 may change the format of specific receive patterns for an adjustable synchronous format. Returning to FIG. 4, control and status information are exchanged with command and status registers 136 via control signal 138 and status signal 140 interfacing with state machine 142.

Figure 6:
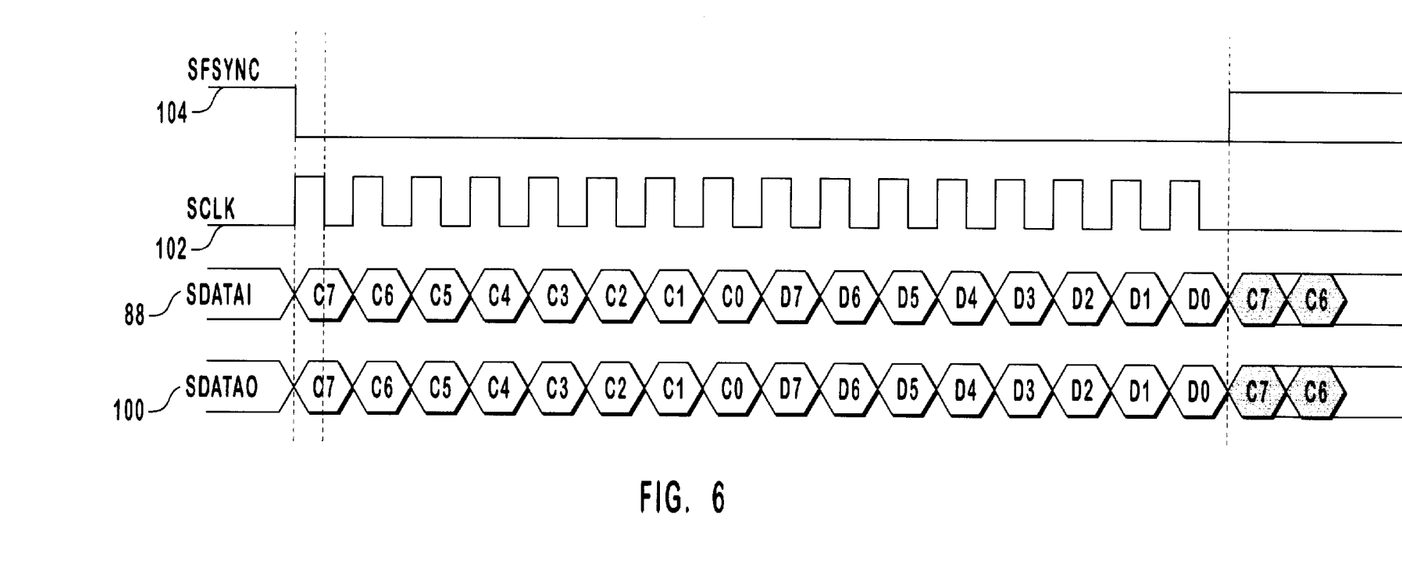
FIG. 6 depicts typical timing of the serial bus interface, in accordance with a preferred embodiment of the present invention.

FIG. 6 is a simplified timing diagram of the serial bus in accordance with a preferred embodiment of the present invention. In the present embodiment, state machine 142 (FIG. 4) regulates and controls serial bus 50. Serial clock 102 is an output signal which defines the timing on the serial bus interface. The frequency of the clock can be programmed and the format of the clock may be continuous or gated. In FIG. 6, serial clock 102 is shown as being a gated clock, however, a continuous clock may also be employed. The serial data in signal 88 illustrates the clocking of the serial data from the shift registers of the external module with the received data being latched concurrent with the following edge of serial clock signal 102. The serial data out signal 100 is the serial data output from the shift registers of the modem with the transitions occurring concurrent with the rising edge of serial clock signal 102.

Finally, serial frame sync signal 104 marks a data word transmission and reception period. In the present embodiment, serial frame sync signal 104 is asserted low whatever serial data out signal 100 is valid and serial frame sync signal 104 is otherwise asserted high. Transitions of serial frame sync signal 104 occur concurrent with the rising edge of serial clock signal 102 with serial frame sync signal 104 being asserted high during fill or loading of the registers.

Figure 7:
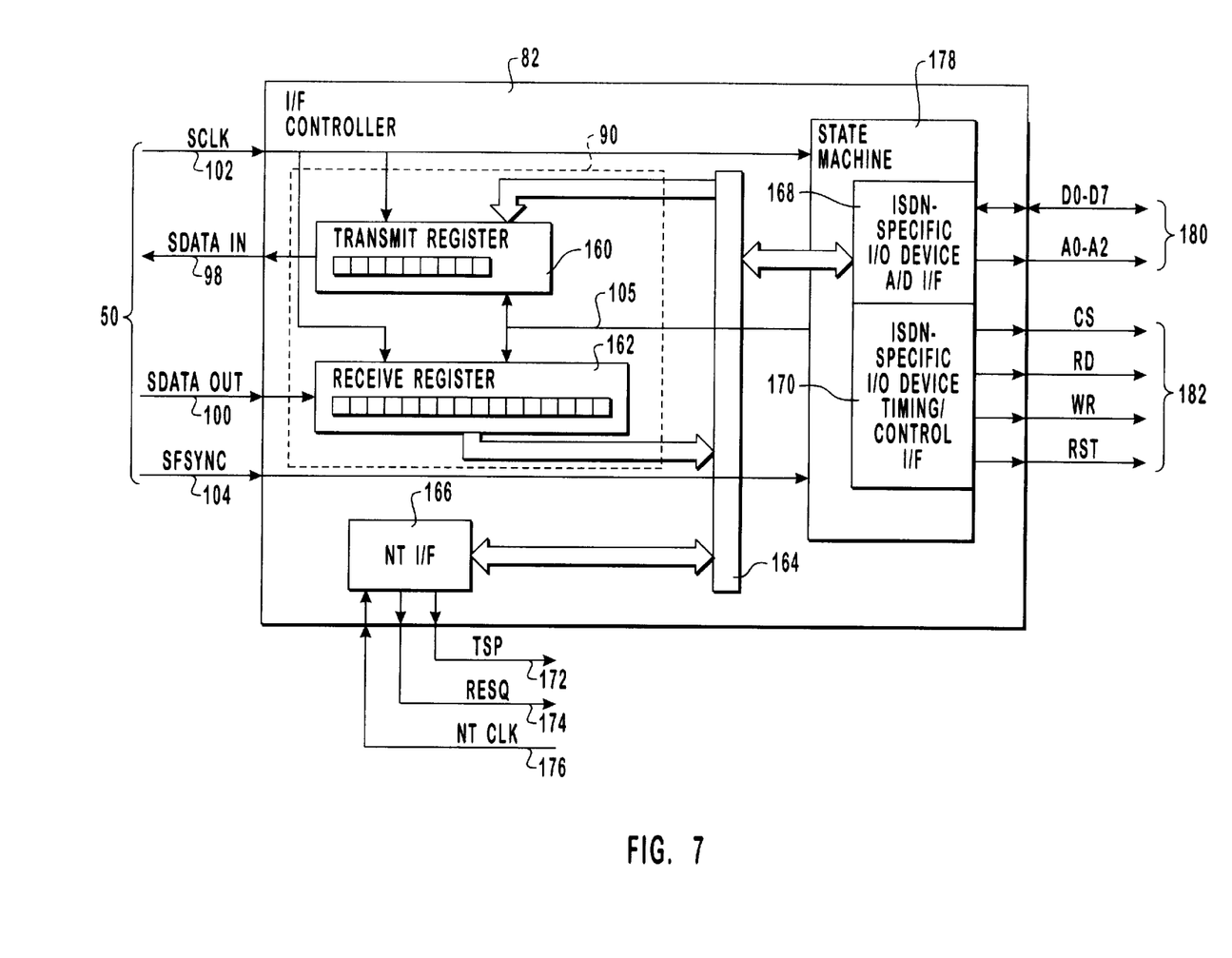
FIG. 7 is an interface controller connected between the serial bus and the co-processor for interfacing with the parallel interface of the co-processor, in accordance with a preferred embodiment of the present invention.

FIG. 7 is a block diagram of an interface controller means, in accordance with the preferred embodiment of the present invention. The interface controller means is operatively and electrically coupled to serial bus 50 and is further coupled to the co-processor to convert parallel information for dispatch to the master processor into a serial format and further to transform serial information received from the master processor into a parallel format for parallel usage by the co-processor. By way of example, and not limitation, in FIG. 7 the interface controller means is depicted as interface controller 82 which, in one preferred embodiment, is implemented as an ASIC device or in alternate configurations may be implemented as discrete components.

Interface controller 82 further comprises a modem interface 90 which yet is comprised of a transmit register 160 and a receive register 162. Transmit register 160 is capable of being parallelly with data read from a co-processor for serial dispatch of data to a master processor while receive register 162 is further capable of serially receiving and buffering commands and data and further being parallelly written to the co-processor. Interface controller 82 is further comprised of a state machine 178 for coordinating the serial and parallel transformation as well as interpretation of received commands for presentation and interaction with the co-processor through ISDN-specific I/O device interface 92 (FIG. 3). ISDN-specific I/O device interface 92 is further comprised of both ISDN-specific I/O device address and data interface 168 providing parallel addressing and data exchange through signals 180 and ISDN-specific I/O device timing and control interface 170 which further provides control signals 182 for direct parallel interface with the co-processor.

Interface controller 82 employs a bus 164 for communication between transmit register 160, receive register 162 and state machine 178. In the present embodiment, state machine 178 receives serial frame sync signal 104 and generates synchronization signal 105 for the respective clocking associated with transmit register 160 and receive register 162. In one preferred embodiment of the present invention employing an ISDN-specific I/O device 84 (FIG. 3), an NT interface 166 having the aforementioned control signals is included to perform the respective ISDN testing with the ISDN system.

Figure 8:
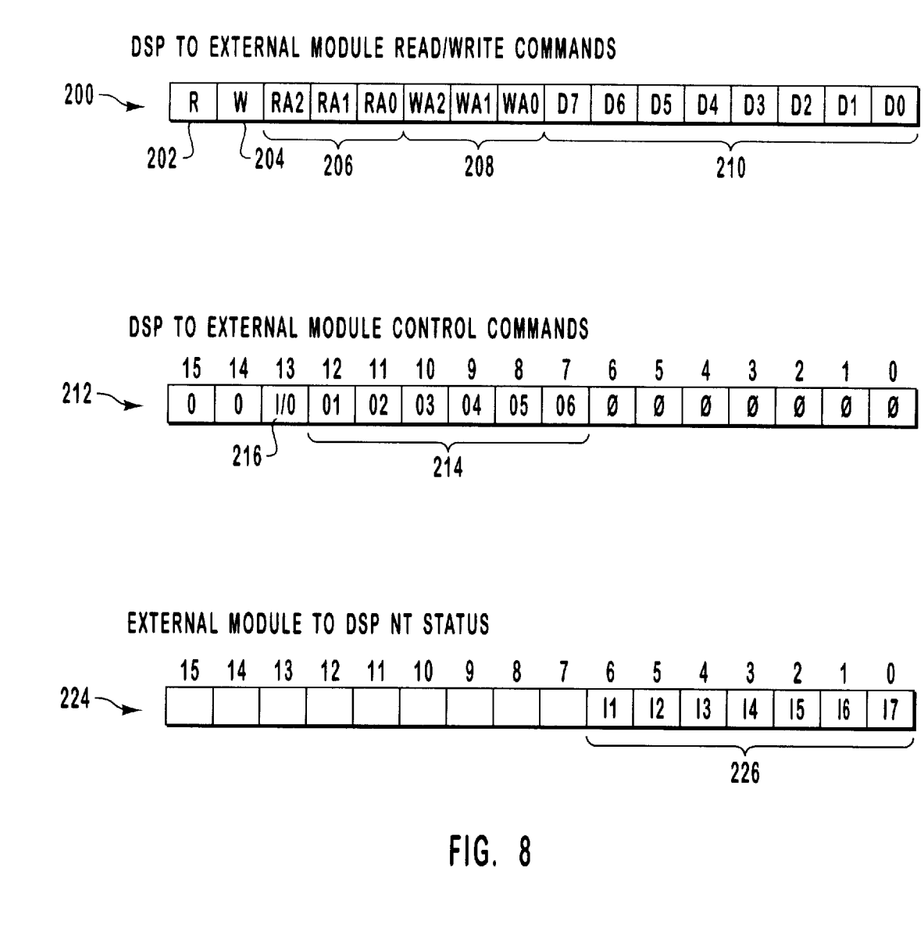
FIG. 8 depicts command and status protocols for interfacing between the serial interface and the interface controller over a serial bus, in accordance with a preferred embodiment of the present invention.

FIG. 8 illustrates particular command formats associated with the read, write and status exchanges, in accordance with the preferred embodiment of the present invention. A DSP to external module read/write command 200 is comprised of a read bit 202, a write bit 204 with read addresses 206 and write addresses 208. Furthermore, a byte of data may be transmitted in command 200 by employing data field 210. Likewise, a command may be transmitted from the DSP to the external module in a DSP to external module control command 212. Such a command is interpreted when both read and write bits 202 and 204 are not asserted. Furthermore, an I/O bit 216 specifies whether data is being written to or read from the external module. Output field 214 accommodates particular command information to be dispatched to the external module.

An external module to DSP NT status 224 employs an input data field 226 for retrieving general purpose input from the external module. While other implementations or formats may be employed, the specific format employed for communication between a first module such as a modem and a second module such as an external module is not critical to the scope of the present invention. While other formats perform equally well in the present invention, the format specified in FIG. 8 is illustrative of the format employed in the preferred embodiment of the present invention.

The present invention may be embodied in other specific forms without departing from the spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patents is:

1. In a data communication system including a first module having a processor with a parallel interface capable of direct interface to a co-processor also having a parallel interface, an apparatus for incorporating said co-processor into a second module serially interconnected to said first module, comprising:
   (a) controller means operatively and electrically parallelly connected to said processor to convert a parallel command/data word for dispatch to said co-processor into a serial command/data word having a serial format and to transform serial information received from said co-processor into a parallel format for receipt by said processor,
   said controller means comprising a serial bus interface means operably and electrically connected to said serial bus including:
      (i) at least one shift register parallelly addressable by said processor to both write information for conversion to said serial format for dispatch to said co-processor and to read information in said parallel format as received from said co-processor;
      (ii) a state machine operably and electrically coupled to said at least one shift register to control each of said at least one shift register as directed by a configuration word from said processor, said serial clock signals, said frame sync signal of said serial bus, and control an interrupt to said processor signifying completion of shifting within said at least one shift register; and
      (iii) configuration and status registers operably and electrically coupled to said state machine to receive said configuration word from said processor to control and monitor said state machine;
   (b) a serial bus operatively and electrically connected to said controller means comprising:
      i. a serial data in signal to transfer data into said first module from said second module;
      ii. a serial data out signal to transfer data into said second module from said first module; and
      iii. a serial clock and frame sync signals both to transfer control signals into said second module from said first module; and
   (c) interface controller means operatively and electrically connected to said serial bus and capable of interfacing with said co-processor to convert parallel information for dispatch to said processor into a serial format and to transform serial information received from said processor into a parallel format for receipt by said co-processor.

2. The apparatus for incorporating said co-processor into a second module serially interconnected to said first module as recited in claim 1, wherein said state machine masters said serial bus including said serial data in signal, said serial data out signal, said serial clock signal and said frame sync signal.

3. The apparatus for incorporating said co-processor into a second module serially interconnected to said first module as recited in claim 1, wherein said state machine further comprises an interrupt signal to said processor upon completion of execution as directed by said configuration and status registers.

4. The apparatus for incorporating said co-processor into a second module serially interconnected to said first module as recited in claim 1, wherein said interface controller means comprises:
   (a) at least one shift register to parallelly capture information from said co-processor for conversion to said serial format for dispatch to said processor and to receive information originating from said processor in said serial format; and
   (b) a state machine operably and electrically coupled to said at least one shift register to control said at least one shift register and parallelly transfer information to and from said co-processor as directed by said command/data word from said processor.

5. The apparatus for incorporating said co-processor into a second module serially interconnected to said first module as recited in claim 1, wherein said controller means further comprises a host interface to couple said first module to a host system.

6. The apparatus for incorporating said co-processor into a second module serially interconnected to said first module as recited in claim 1, wherein said first module is a modem and said processor is a digital signal processor (DSP).

7. The apparatus for incorporating said co-processor into a second module serially interconnected to said first module as recited in claim 6, wherein said DSP further includes ISDN functionality and said co-processor is an ISDN-specific interface device.

8. The apparatus for incorporating said co-processor into a second module serially interconnected to said first module as recited in claim 7, wherein said interface control means further comprises ISDN NT testing capability.

9. In a data communication system including a first module having a processor with a parallel interface capable of direct interface to a co-processor also having a parallel interface, an apparatus for incorporating said co-processor into a second module serially interconnected to said first module, comprising:
   (a) controller means operatively and electrically parallelly connected to said processor to convert a parallel command/data word for dispatch to said co-processor into a serial command/data word having a serial format and to transform serial information received from said co-processor into a parallel format for receipt by said processor;
(b) a serial bus operatively and electrically connected to said controller means comprising:
  i. a serial data in signal to transfer data into said first module from said second module;
  ii. a serial data out signal to transfer data into said second module from said first module; and
  iii. a serial clock and frame sync signals both to transfer control signals into said second module from said first module;
  iv. an interrupt signal operably and electrically coupled from said co-processor to said processor to request service by said processor; and
(c) interface controller means operatively and electrically connected to said serial bus and capable of interfacing with said co-processor to convert parallel information for dispatch to said processor into a serial format and to transform serial information received from said processor into a parallel format for receipt by said co-processor.

10. In a data communication system including a modem having a processor with a parallel interface capable of direct interface to an ISDN-specific interface device also having a parallel interface, an apparatus for incorporating said ISDN-specific interface device into an external module serially interconnected to said modem, comprising:
(a) a controller operatively and electrically parallelly connected to said processor to convert a parallel command/data word for dispatch to said ISDN-specific interface device into a serial command/data word having a serial format and to transform serial information received from said ISDN-specific interface device into a parallel format for receipt by said processor;
  (i) at least one shift register parallelly addressable by said processor to both write information for conversion to said serial format for dispatch to said ISDN-specific interface device and to read information in said parallel format as received from said ISDN-specific interface device;
  (ii) a state machine operably and electrically coupled to said at least one shift register to control said at least one shift register as directed by a configuration word from said processor, said state machine also interfacing each of said serial clock and said frame sync of said serial bus; and
  (iii) configuration and status registers operably and electrically coupled to said state machine to receive said configuration word from said processor to direct control and monitoring of said state machine
(b) a serial bus operatively and electrically connected to said controller including a serial data in signal to transfer data to said modem from said external module and a serial data out signal to transfer data to said external module from said modem; and
(c) an interface controller operatively and electrically connected to said serial bus and said ISDN-specific interface device to convert parallel information for dispatch to said processor into a serial format and to transform serial information received from said processor into a parallel format for receipt by said ISDN-specific interface device.

11. The apparatus for incorporating said ISDN-specific interface device into an external module serially interconnected to said modem as recited in claim 10, wherein said state machine masters said serial bus including said serial data in signal, said serial data out signal, said serial clock and said frame sync.

12. The apparatus for incorporating said ISDN-specific interface device into an external module serially interconnected to said modem as recited in claim 10, wherein said state machine further generates an interrupt signal to said processor upon completion of execution as directed by said configuration and status registers.

13. The apparatus for incorporating said ISDN-specific interface device into an external module serially interconnected to said modem as recited in claim 10, wherein said interface controller comprises:
(a) at least one shift register to parallelly capture information from said co-processor for conversion to said serial format for dispatch to said processor and to receive information originating from said processor in said serial format; and
(b) a state machine operably and electrically coupled to said at least one shift register to control said at least one shift register and parallelly transfer information to and from said co-processor as directed by said command/data word from said processor.

14. The apparatus for incorporating said ISDN-specific interface device into an external module serially interconnected to said modem as recited in claim 10, wherein said processor is a digital signal processor (DSP).

15. In a data communication system including a modem having a processor with a parallel interface capable of direct interface to an ISDN-specific interface device also having a parallel interface, an apparatus for incorporating said ISDN-specific interface device into an external module serially interconnected to said modem comprising:
(a) a controller operatively and electrically parallelly connected to said processor to convert a parallel command/data word for dispatch to said ISDN-specific interface device into a serial command/data word having a serial format and to transform serial information received from said ISDN-specific interface device into a parallel format for receipt by said processor;
(b) a serial bus operatively and electrically connected to said controller including a serial data in signal to transfer data to said modem from said external module and a serial data out signal to transfer data to said external module from said modem, said serial bus further comprising an interrupt signal operably and electrically coupled from said ISDN-specific interface device to said processor; and
(c) an interface controller operatively and electrically connected to said serial bus and said ISDN-specific interface device to convert parallel information for dispatch to said processor into a serial format and to transform serial information received from said processor into a parallel format for receipt by said ISDN-specific interface device.

16. In a data communication system including a modem having an external interface operably coupled via a serial interface to a modem interface of an external module, a method for operatively incorporating into said external module a portion of modem circuitry having a parallel interface compatible with said modem, said method comprising the steps of:
(a) providing a serial physical interface between said modem including:
  i) a serial data in signal to receive data into said modem from said external module;

ii) a serial data out signal to receive data into said external module from said modem; and iii) a serial clock and frame sync both to receive control signals into said external module from said modem; and (b) defining a serial exchange protocol between said modem and said external module comprising:

i) a transmit serial word exchanged from said modem to said external module, said transmit serial word including a read/write designator, read and write address designators, and a data payload portion;

ii) a receive serial word exchanged from said external module to said modem, said transmit serial word including a data payload portion;

iii) when said frame sync is asserted, said external module validly receiving a bit of said transmit serial word from said modem via said serial data out signal from said modem at said external module with each period of said serial clock; and iv) when said frame sync is asserted, validly receiving a bit of said receive serial word from said external module with each period of said serial clock.

17. The method as recited in claim 16, wherein said serial physical interface further comprises an interrupt signal to inform said modem of a service request by said external module.

18. The method as recited in claim 16, wherein said transmit serial word further comprises control commands for controlling said external module, and wherein said receive serial word further comprises status inputs describing a condition of said external module.

* * * * *